Dec. 27, 1927.
W. M. KELLY
1,654,127
MACHINE ELEMENT
Original Filed Aug. 6, 1921
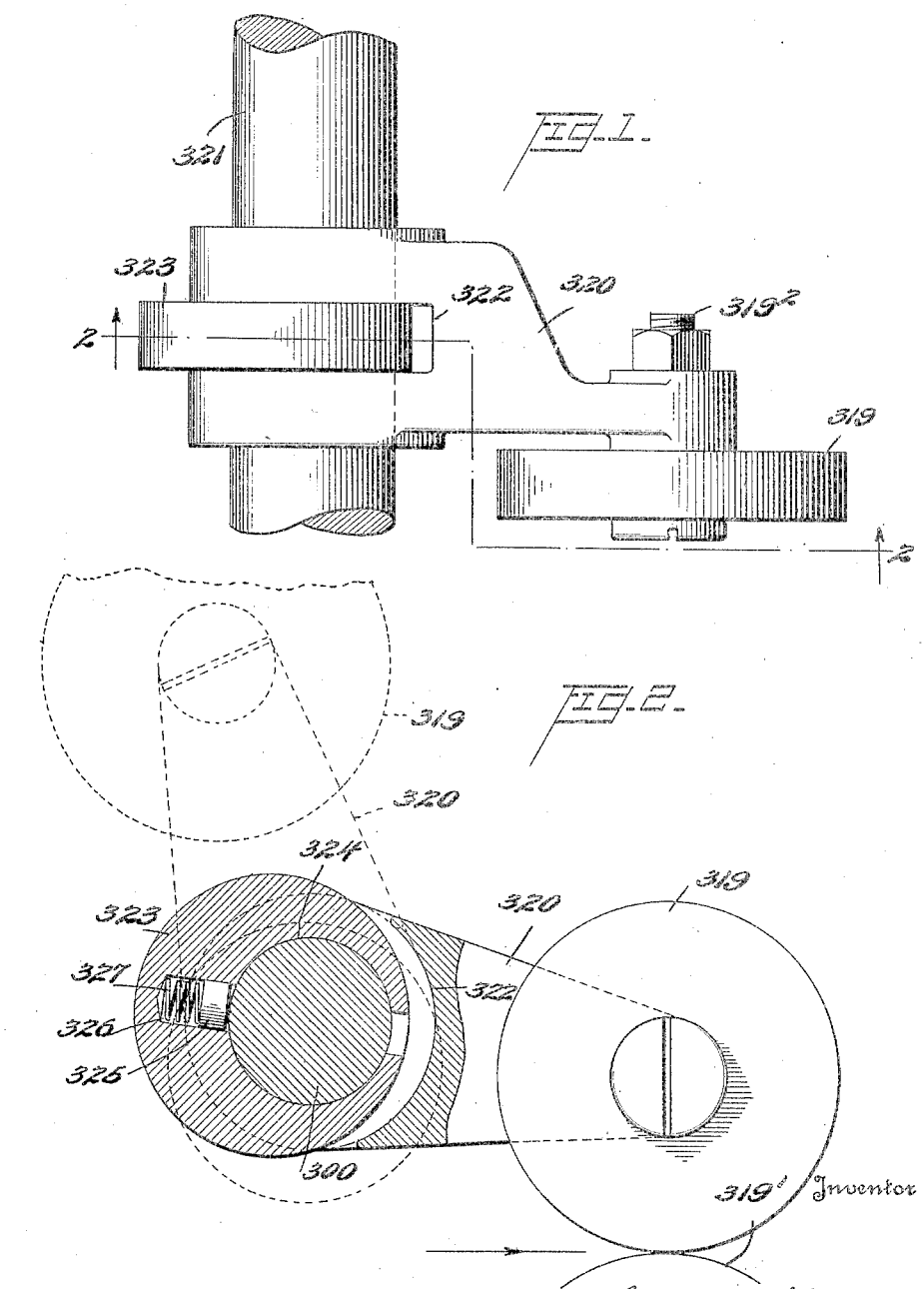

Patented Dec. 27, 1927.

1,654,127

UNITED STATES PATENT OFFICE.

WILLIAM M. KELLY, OF WESTFIELD, NEW JERSEY.

MACHINE ELEMENT.

Original application filed August 6, 1921, Serial No. 490,290. Divided and this application filed June 13, 1925. Serial No. 36,943.

This application is a division of my copending application Serial No. 490,290, filed August 6, 1921.

This invention relates to certain improvements in supporting brackets for the paper guide rollers of printing presses, and the object of the invention is to provide improved means for frictionally holding such brackets and the rollers carried thereby in any position to which they may be adjusted, while permitting manual adjustment thereof either transversely of or about the shaft on which the brackets are mounted, and frictionally holding the rollers in raised position when desired.

In the accompanying drawing:

Figure 1 is a top plan view of a roller bracket, and its support, embodying my invention; and Figure 2 is a vertical section thereof, on the line 2—2 of Figure 1.

In the use of guide rollers of the character referred to, it is necessary at times to adjust such rollers longitudinally of their support, to take care of paper of different widths. As shown, for this purpose the roller 319 is carried by a bracket 320 mounted on a stub shaft $319^2$ at the outer end of the bracket 320, the inner end of the latter being bifurcated, and the arms thus formed are slidably mounted on a shaft 300.

At the base of the arms the surface 322 is formed concentric with the axis of the shaft 300. Mounted on the shaft between the arms is a collar 323 which is formed with an eccentric bore 324 for the shaft. This collar is frictionally held to the shaft by a plug 325 disposed in a radial recess 326 and yieldingly forced into contact with the shaft by a spring 327. This recess 326 is made by drilling through from the opposite side of the collar. As the collar 323 is frictionally held on the shaft it holds bracket 320 against longitudinal movement. Furthermore because of the eccentric surface of the collar and the concentric surface 322 of the bracket, the bracket and roller may be swung upwardly to the position shown in dotted lines and held there. It is to be understood, however, that the frictional resistance to adjustment is of no substantial amount, so that the bracket may be adjusted on the shaft very easily by the operator.

It will be understood that the sheets of paper are fed between the roller 319 and roller $319^1$, the latter roller also being adjustable axially of its supporting shaft.

Having thus described the invention, what is claimed as new and desired to be secured by Letters Patent is:

1. The combination with an imperforate shaft of a device longitudinally adjustable on the shaft and means to frictionally hold the device in adjusted position including a collar on the shaft having a flat member yieldingly bearing directly on the shaft.

2. The combination with a shaft of a roller carrying device longitudinally and rotatably adjustable on the shaft and means to frictionally hold the device in adjusted position including a collar on the shaft having a radially spring pressed member frictionally bearing on the shaft.

3. The combination with a shaft of a roller carrying device longitudinally adjustable on the shaft and means to frictionally hold the device in adjusted position including a collar on the shaft having a radial recess opening in the bore of the collar, and a spring pressed member in said recess bearing on the outer surface of the shaft.

4. The combination wth a shaft of a roller carrying bracket rotatably and longitudinally adjustable on said shaft and means to limit the extent of rotative movement and hold it against longitudinal movement including a circular collar eccentrically mounted on the shaft and having yielding friction means bearing on the shaft.

5. The combination with a shaft of a roller carrying bracket having a pair of spaced arms rotatively and longitudinally adjustable on said shaft, and means to limit the extent of rotative movement of the bracket and hold it against longitudinal movement including a circular collar eccentrically mounted on said shaft between said arms and having yielding friction means bearing on said shaft.

6. The combination with a shaft of a roller carrying bracket longitudinally adjustable on said shaft having a pair of spaced arms provided with bores receiving the shaft, and means to frictionally hold the bracket against adjustment comprising a collar on the shaft between said arms and having a yielding friction device engaging the shaft.

7. The combination with a shaft of a roller carrying member rotatively and longitudinally movable thereon and means to frictionally hold it from movement comprising a radially spring pressed flat member frictionally engaging the shaft.

8. The combination with a shaft of a roller carrying member oscillatably mounted on said shaft, positioning means for said member comprising a collar having a bore receiving said shaft, and formed with a radial recess opening from said bore, a flat plug in said recess and a spring forcing said plug into frictional engagement with said shaft.

9. As an article of manufacture, a circular collar having an eccentric bore, and formed with a radial recess opening from said bore in the direction of its eccentricity, a flat shaft-engaging friction plug in said recess, and a spring in the recess pressing the plug inwardly.

In testimony whereof I hereunto affix my signature.

WILLIAM M. KELLY.